(12) United States Patent
Uneura et al.

(10) Patent No.: US 9,891,123 B2
(45) Date of Patent: Feb. 13, 2018

(54) WHEEL FASTENING INSPECTION METHOD, WHEEL FASTENING METHOD, WHEEL FASTENING INSPECTION DEVICE AND WHEEL FASTENING DEVICE

(71) Applicant: IHI Corporation, Tokyo (JP)

(72) Inventors: Yutaka Uneura, Tokyo (JP); Shinichi Kaneda, Tokyo (JP); Yuichi Daito, Tokyo (JP)

(73) Assignee: IHI Corporation, Tokyo (JP)

( * ) Notice: Subject to any disclaimer, the term of this patent is extended or adjusted under 35 U.S.C. 154(b) by 265 days.

(21) Appl. No.: 14/740,868

(22) Filed: Jun. 16, 2015

(65) Prior Publication Data

US 2015/0276523 A1 Oct. 1, 2015

Related U.S. Application Data

(63) Continuation of application No. PCT/JP2014/054671, filed on Feb. 26, 2014.

(30) Foreign Application Priority Data

Apr. 12, 2013 (JP) .................................. 2013-084013

(51) Int. Cl.
  *G01L 5/24* (2006.01)
  *G01L 1/10* (2006.01)
  (Continued)

(52) U.S. Cl.
  CPC ................. *G01L 5/12* (2013.01); *F01D 5/04* (2013.01); *F01D 5/10* (2013.01); *F01D 21/003* (2013.01);
  (Continued)

(58) Field of Classification Search
  CPC . F01D 5/04; F01D 5/10; F01D 21/003; F01D 25/04; G01L 5/246; G01L 1/106;
  (Continued)

(56) References Cited

U.S. PATENT DOCUMENTS 4,705,463 A * 11/1987 Joco ........................ F01D 5/025
  29/889.2
4,941,760 A * 7/1990 Suzuki .................... F01D 25/16
  384/537
(Continued)

FOREIGN PATENT DOCUMENTS

CN    1555457 A    12/2004
EP    1304463 A1 *  4/2003
(Continued)

OTHER PUBLICATIONS

Office Action dated Aug. 2, 2016 in Japanese Patent Application No. 2015-511148.

(Continued)

*Primary Examiner* — J M Saint Surin
(74) *Attorney, Agent, or Firm* — Oblon, McClelland, Maier & Neustadt, L.L.P.

(57) ABSTRACT

An wheel fastening inspection method includes: directly or indirectly applying vibration to a turbine shaft to be inserted to a bearing housing, the turbine shaft being provided with wheels at both ends protruding from the bearing housing, at least one of the wheels being fastened by a fastening member, and a rotary member being fastened by a fastening force generated by the fastening member to the turbine shaft to be integrally rotated with the wheel; measuring the vibration of the turbine shaft; and determining whether or not a vibration frequency at which a peak of the measured vibration of the turbine shaft is given is included in a setting range previously set.

16 Claims, 5 Drawing Sheets

(51) Int. Cl.
*F01D 5/04* (2006.01)
*F01D 1/00* (2006.01)
*F04D 29/26* (2006.01)
*G01L 5/12* (2006.01)
*F01D 5/10* (2006.01)
*F01D 21/00* (2006.01)
*F01D 25/04* (2006.01)

(52) U.S. Cl.
CPC ........... *F01D 25/04* (2013.01); *F04D 29/266* (2013.01); *G01L 1/106* (2013.01); *G01L 5/246* (2013.01); *F05D 2220/40* (2013.01); *F05D 2260/96* (2013.01)

(58) Field of Classification Search
CPC ..... G01L 5/12; F04D 29/266; F05D 2220/40; F05D 2260/96
USPC ...................................... 73/862.49
See application file for complete search history.

(56) References Cited

U.S. PATENT DOCUMENTS

| | | | | |
|---|---|---|---|---|
| 5,016,471 | A * | 5/1991 | Och | G01M 13/021 33/501.13 |
| 5,174,733 | A | 12/1992 | Yoshikawa et al. | |
| 6,364,634 | B1 * | 4/2002 | Svihla | F01D 5/025 417/409 |
| 2004/0202556 | A1 * | 10/2004 | Svihla | F01D 5/026 417/407 |
| 2009/0151348 | A1 * | 6/2009 | Hayashi | F01D 25/16 60/598 |

FOREIGN PATENT DOCUMENTS

| | | |
|---|---|---|
| JP | 5-346420 A | 12/1993 |
| JP | 7-333085 | 12/1995 |
| JP | 08-170933 A | 7/1996 |
| JP | 2002-214034 | 7/2002 |
| JP | 2002-340710 A | 11/2002 |
| JP | 2002-367492 | 12/2002 |
| JP | 2009-228446 | 10/2009 |
| JP | 2011-033348 | 2/2011 |
| JP | 2011-149841 | 8/2011 |
| JP | 2011-220713 A | 11/2011 |
| JP | 2012-012995 | 1/2012 |
| WO | 2004/011893 A1 | 2/2004 |

OTHER PUBLICATIONS

Combined Office Action and Search Report dated Nov. 26, 2015 in Chinese Patent Application No. 201480003632.1 (with English translation).

International Search Report issued in Application No. PCT/JP2014/054671 dated Apr. 8, 2014 (w/ English Translation).

* cited by examiner

WHEEL FASTENING INSPECTION METHOD, WHEEL FASTENING METHOD, WHEEL FASTENING INSPECTION DEVICE AND WHEEL FASTENING DEVICE

CROSS REFERENCE TO RELATED APPLICATIONS

This application is a continuation application of International Application No. PCT/JP2014/054671 filed Feb. 26, 2014, which claims priority to Japanese Patent Application No. 2013-084013 filed Apr. 12, 2013, the entire contents of each of which are incorporated by references herein.

BACKGROUND

1. Technical Field

The present disclosure relates to a wheel fastening inspection method which checks whether or not a fastening force when a rotary member is fastened to a turbine shaft is appropriate, a wheel fastening method, a wheel fastening inspection device and a wheel fastening device.

2. Description of the Related Art

A conventional turbocharger is provided with a bearing housing, and a turbine shaft which is rotatably supported to the bearing housing, is provided with a turbine wheel (a turbine impeller) at its one end and is provided with a compressor wheel (a compressor impeller) at its other end. The turbocharger is connected to an engine, rotates the turbine wheel by exhaust gas which is discharged from the engine, and rotates the compressor wheel via the turbine shaft by the rotation of the turbine wheel. As described above, the turbocharger compresses air along with the rotation of the compressor wheel and supercharges the engine.

The turbine shaft has a step portion which is formed closer to the compressor wheel side than a position where a radial bearing is provided. An outer diameter of the step portion is smaller than an outer diameter of the position where the radial bearing is provided. A rotary member such as a thrust collar or an oil thrower, and the compressor wheel are sequentially attached to the turbine shaft up to the step portion with no gap in an axial direction. Finally, a nut is screwed to a shaft end side of the turbine shaft. According to the screwing, an axial force (a fastening force generated by the nut) of the turbine shaft is applied to a contact portion among the step portion, the rotary member and the compressor wheel. The axial force suppresses rotational deviation between the rotary member and the compressor wheel, and the turbine shaft at the time of engine operation. For example, a preset-type torque wrench which can set the fastening torque can be used for fastening the nut.

In the case where the preset-type torque wrench is used for fastening the nut, variation is generated in the axial force which is generated with respect to the fastening torque of the nut. This is caused by individual difference in a coefficient of friction between the rotary member and the compressor wheel which are fastened by the nut. Therefore, an appropriate torque management is required for fastening the nut. Furthermore, for example, in the case or the like where the compressor wheel is attached to the turbine shaft by press fitting, it is necessary to insert the thrust collar and the oil thrower to the turbine shaft with no gap in order to apply a desired axial force to the thrust collar and the oil thrower. Therefore, in this case, an appropriate load management for the press fitting of the compressor wheel (hereinafter, referred to as a press fitting force management) is required for the press fitting of the compressor wheel.

In Japanese Patent Laid-Open Publication No. 2009-228446 (Patent Literature 1), a technique for specifying the axial force is disclosed. In this technique, the turbine shaft has a chamfer portion extending in an axial direction, at a position where the compressor wheel is attached. In addition, a strain gauge is attached to the chamfer portion. The axial force is derived from the strain of the turbine shaft which is measured by the strain gauge. Note that a lead wire of the strain gauge is drawn to the outside through a hole which communicates from the chamfer portion to the shaft end of the turbine shaft.

SUMMARY

The technique for deriving the axial force by an output value of the strain gauge such as Patent Literature 1 described above is effective in the case of measuring an accurate axial force in a testing machine. However, recovery of the strain gauge is difficult in application to a mass-produced machine, and a lot of man-hours are required for measurement to thereby cause a high cost.

An object of the present disclosure is to provide a wheel fastening inspection method which can check at a low cost whether or not the axial forces of the turbine shaft, the rotary member and the compressor wheel are appropriate, a wheel fastening method, a wheel fastening inspection device and a wheel fastening device.

A first aspect of the present disclosure is a wheel fastening inspection method including: directly or indirectly applying vibration to a turbine shaft to be inserted to a bearing housing, the turbine shaft being provided with wheels at both ends protruding from the bearing housing, at least one of the wheels being fastened by a fastening member, and a rotary member being fastened by a fastening force generated by the fastening member to the turbine shaft to be integrally rotated with the wheel; measuring the vibration of the turbine shaft; and determining whether or not a vibration frequency at which a peak of the measured vibration of the turbine shaft is given is included in a setting range previously set.

A second aspect of the present disclosure is a wheel fastening method comprising: fastening at least one of wheels at both ends of a turbine shaft by a fastening member, the turbine shaft being inserted to a bearing housing, and the both ends of the turbine shaft protruding from the bearing housing, and fastening a rotary member integrally rotated with the wheels to the turbine shaft by a fastening force generated by the fastening member; directly or indirectly applying vibration to the turbine shaft; measuring the vibration of the turbine shaft; and determining whether or not a vibration frequency at which a peak of the measured vibration of the turbine shaft is given is included in a setting range previously set.

A third aspect of the present disclosure is a wheel fastening inspection device including: a vibration application portion configured to directly or indirectly apply vibration to a turbine shaft to be inserted to a bearing housing, turbine shaft being provided with wheels at both ends protruding from the bearing housing, at least one of the wheels being fastened by a fastening member, and a rotary member being fastened by a fastening force generated by the fastening member to the turbine shaft to be integrally rotated with the wheel; a measurement portion configured to measure the vibration of the turbine shaft; and a determination portion configured to determine whether or not a vibration frequency at which a peak of the measured vibration of the turbine shaft is given is included in a setting range previously set.

A fourth aspect of the present disclosure is a wheel fastening device including: a fastening portion configured to fasten at least one of wheels at both ends of a turbine shaft by a fastening member, the turbine shaft being inserted to a bearing housing, and the both ends of the turbine shaft protruding from the bearing housing, and the fastening portion configured to fasten a rotary member integrally rotated with the wheels to the turbine shaft by a fastening force generated by the fastening member; a vibration application portion configured to directly or indirectly apply vibration to the turbine shaft; a measurement portion configured to measure the vibration of the turbine shaft; and a determination portion configured to determine whether or not a vibration frequency at which a peak of the measured vibration of the turbine shaft is given is included in a setting range previously set.

According to the present disclosure, it is possible to check at a low cost whether or not the axial forces of the turbine shaft, the rotary member and the compressor wheel are appropriate.

DESCRIPTION OF THE EMBODIMENTS

Hereinafter, embodiments of the present disclosure will be described with reference to the accompanying drawings. Dimensions, materials and the other specific numerical values shown in the embodiment are only exemplified for easily understanding the disclosure, and do not restrict the present disclosure unless otherwise stated. Note that, in the present specification and drawings, an overlapping explanation will be omitted by attaching the same reference numerals to elements substantially having the same function and configurations, and an illustration of elements which do not have any direct relation to the present disclosure will be omitted.

Figure 1:
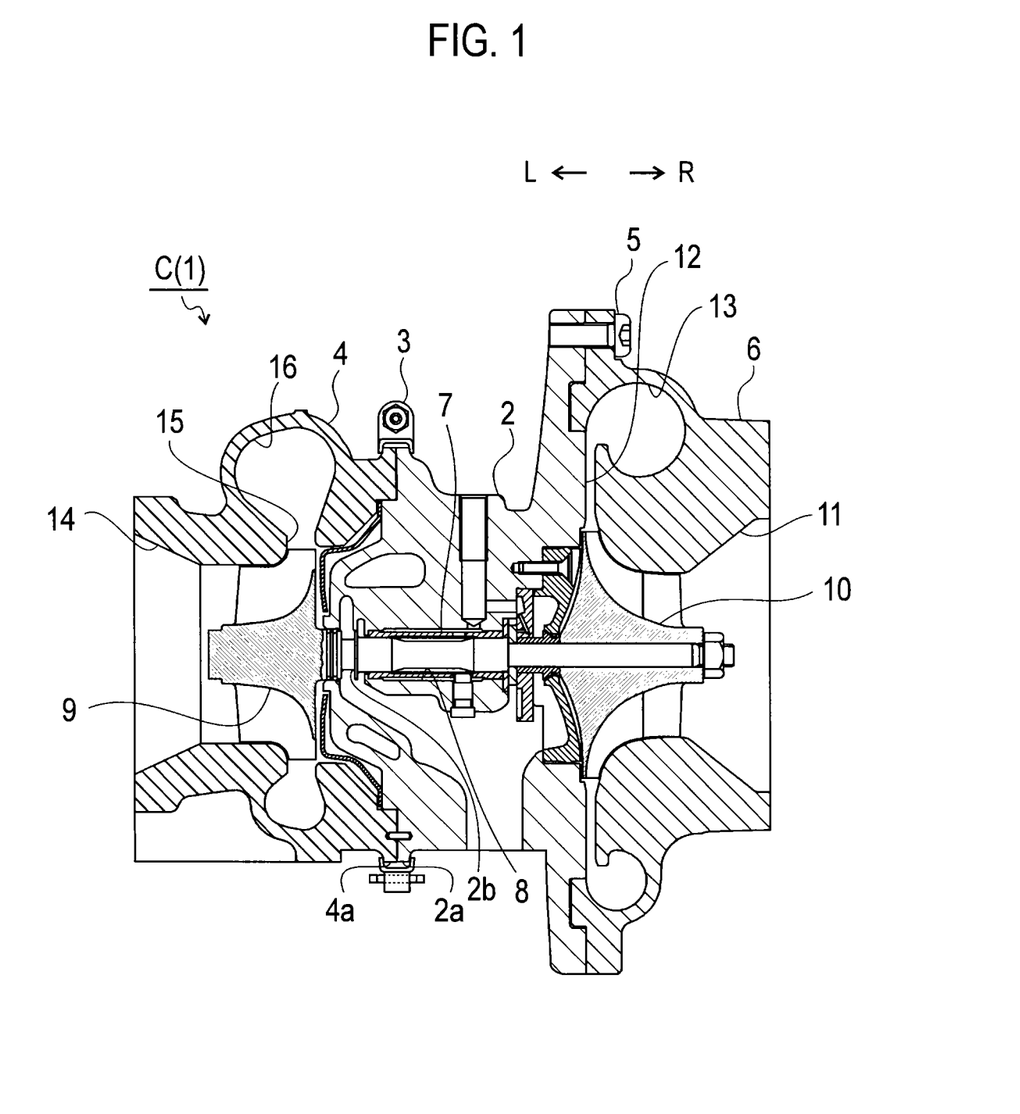
FIG. 1 is a schematic cross-sectional view of a turbocharger according to an embodiment of the present disclosure.

FIG. 1 is a schematic cross-sectional view of a turbocharger C. Hereinafter, a description will be given on the assumption that a direction shown by an arrow L in FIG. 1 is a left side of the turbocharger C, and a direction shown by an arrow R is a right side of the turbocharger. As shown in FIG. 1, the turbocharger C is provided with a turbocharger main body 1. The turbocharger main body 1 is provided with a bearing housing 2, a turbine housing 4 which is connected to a left side of the bearing housing 2 by a fastening mechanism 3, and a compressor housing 6 which is connected to a right side of the bearing housing 2 by a fastening bolt 5. The turbocharger main body 1 is formed by integrating them.

A projection 2a protruding in a radial direction of the bearing housing 2 is provided on an outer peripheral surface in the vicinity of the turbine housing 4 of the bearing housing 2. In addition, a projection 4a protruding in a radial direction of the turbine housing 4 is provided on an outer peripheral surface in the vicinity of the bearing housing 2 of the turbine housing 4. The bearing housing 2 and the turbine housing 4 are fixed by fastening with band the projections 2a and 4a by the fastening mechanism 3. The fastening mechanism 3 is constituted by a coupling which holds the projections 2a and 4a therebetween.

A bearing hole 2b penetrating in a lateral direction of the turbocharger C is formed in the bearing housing 2. A radial bearing 7 is provided in the bearing hole 2b. The radial bearing 7 rotatably supports a turbine shaft 8. A turbine wheel (turbine impeller) 9 is integrally fixed to a left end portion (one end) of the turbine shaft 8. The turbine wheel 9 is rotatably housed within the turbine housing 4. In addition, a compressor wheel (compressor impeller) 10 is integrally fixed to a right end portion (the other end) of the turbine shaft 8. The compressor wheel 10 is rotatably housed within the compressor housing 6.

An intake port 11 is formed in the compressor housing 6. The intake port 11 is open to the right side of the turbocharger C, and is connected to an air cleaner (not shown). In addition, in a state where the bearing housing 2 and the compressor housing 6 are connected by the fastening bolt 5, facing surfaces of both the housings 2 and 6 form a diffuser flow passage 12 which raises pressure of the air. The diffuser flow passage 12 is formed annularly toward an outer side from an inner side in the radial direction of the turbine shaft 8 (the compressor wheel 10), and is communicated with the intake port 11 via the compressor wheel 10 in the inner side in the radial direction described above.

Additionally, the compressor housing 6 is provided with an annular compressor scroll flow passage 13 which is positioned closer to an outer side in a radial direction of the turbine shaft 8 (the compressor wheel 10) than the diffuser flow passage 12. The compressor scroll flow passage 13 is communicated with the intake port of the engine (not shown), and is also communicated with the diffuser flow passage 12. When the compressor wheel 10 rotates, air is sucked into the compressor housing 6 form the intake port 11, and the sucked air is accelerated by an action of a centrifugal force in the process of circulating between blades of the compressor wheel 10, and is pressure-raised by the diffuser flow passage 12 and the compressor scroll flow passage 13 to thereby be led to the intake port of the engine.

A discharge port 14 is formed in the turbine housing 4. The discharge port 14 is open to a left side of the turbocharger C, and is connected to an exhaust gas purification device (not shown). Additionally, the turbine housing 4 is provided with a flow passage 15, and an annular turbine scroll flow passage 16 which is positioned closer to the outer side in the radial direction of the turbine shaft 8 (the turbine wheel 9) than the flow passage 15. The turbine scroll flow passage 16 is communicated with a gas inflow port (not shown) of the exhaust gas, and is also communicated with the flow passage 15. Therefore, the exhaust gas is discharged from an exhaust manifold of the engine (not shown), and is then led to the gas inflow port. Furthermore, the exhaust gas is led to the turbine scroll flow passage 16 from the gas inflow port, and is led to the discharge port 14 via the flow passage 15 and the turbine wheel 9. In the circulation process, the exhaust gas rotates the turbine wheel 9. A rotating force of the turbine wheel 9 is transmitted to the compressor wheel 10 via the turbine shaft 8. As a result, the air is pressure-raised by the rotating force of the compressor wheel 10, and is led to the intake port of the engine.

Figure 2:
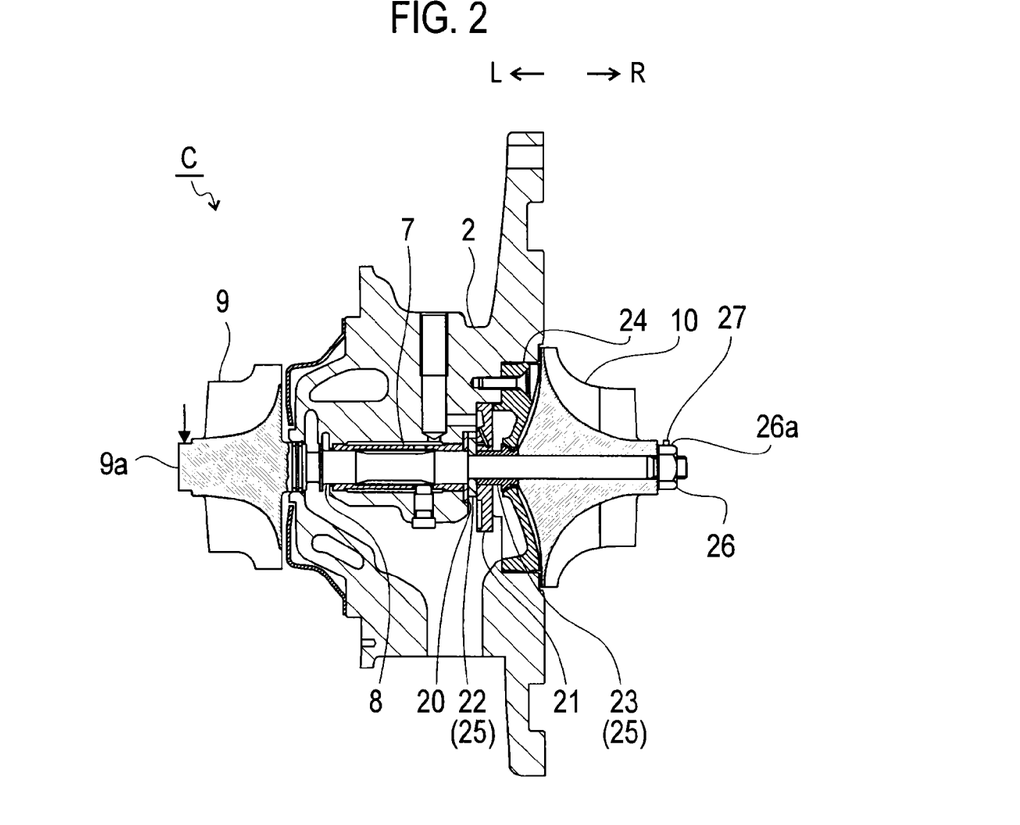
FIG. 2 is a schematic cross-sectional view of the turbocharger before a turbine housing and a compressor housing are attached.

FIG. 2 is a schematic cross-sectional view of the turbocharger C before the turbine housing 4 and the compressor housing 6 are attached. In the same way as FIG. 1, a description will be given on the assumption that a direction shown by an arrow L in FIG. 2 is the left side of the turbocharger C, and a direction shown by an arrow R is the right side of the turbocharger C. As shown in FIG. 2, two thrust bearings 20 and 21 are provided in an inner portion of the bearing housing 2. The thrust bearings 20 and 21 are arranged right and left so as to sandwich a thrust collar 22, and receive a thrust load which acts on the turbine shaft 8. The turbine shaft 8 is inserted to the thrust bearings 20 and 21 and the thrust collar 22.

An oil thrower 23 is adjacent to a right side of the thrust collar 22. An end portion on a left side of the oil thrower 23 is inserted to the thrust bearing 21. Aright side of the oil thrower 23 is inserted to a seal plate 24. The oil thrower 23 has a site protruding outward in a radial direction. The site is positioned closer to the seal plate 24 between the thrust bearing 21 and the seal plate 24, and suppresses a lubricating oil leakage from the seal plate 24 to the right side by scattering the lubricating oil outward in a radial direction. In addition, the compressor wheel 10 is adjacent to the right side of the oil thrower 23.

A rotary member 25 is constituted by the thrust collar 22 and the oil thrower 23. The rotary member 25 and the compressor wheel 10 are fastened to the turbine shaft 8 so as to rotate integrally with the turbine shaft 8. A gap is provided between the thrust bearing 20 and the turbine shaft 8 in the radial direction, and they are relatively rotatable with each other. A gap is also provided between the oil thrower 23 and the thrust bearing 21 in the radial direction, and they are relatively rotatable with each other. Furthermore, a gap is provided also between the oil thrower 23 and the seal plate 24, and they are relatively rotatable with each other.

Figure 3:
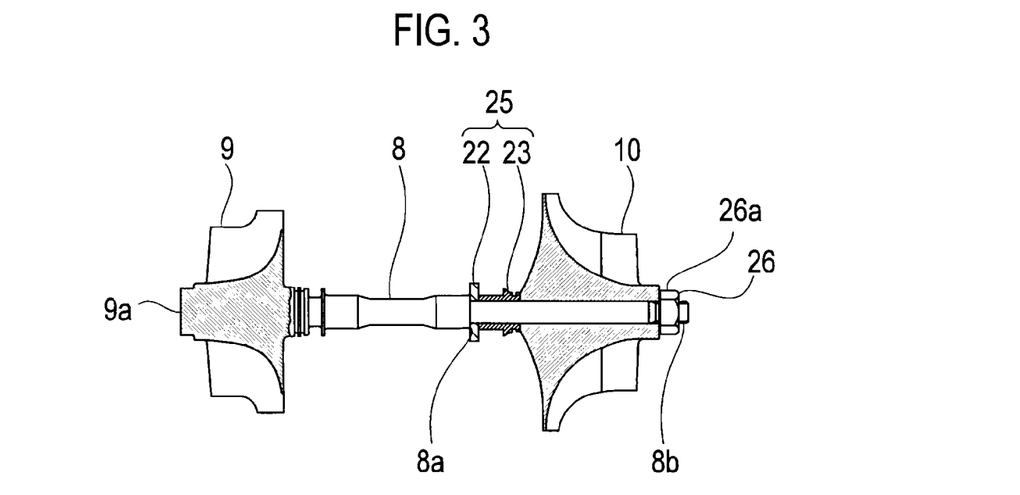
FIG. 3 is an explanatory view for explaining fastening of a turbine shaft, a rotary member and a compressor wheel.

FIG. 3 is an explanatory view for explaining the fastening of the turbine shaft 8, the rotary member 25 and the compressor wheel 10. The turbine wheel 9 is fixed to the turbine shaft 8 by welding or the like, and rotates integrally with the turbine shaft 8. On the other hand, the compressor wheel 10 is fastened to the turbine shaft 8 by a nut 26 (a fastening member) together with the thrust collar 22 and the oil thrower 23 so as to rotate integrally with the turbine shaft 8. The nut 26 is screwed to a thread groove 8*b* which is provided on the shaft end side of the turbine shaft 8.

As shown in FIG. 3, a step portion 8*a* is formed in the turbine shaft 8. The turbine shaft 8 is formed so that an outer diameter on the turbine wheel 9 side is larger than an outer diameter on the compressor wheel 10 side, with the step portion 8*a* as a boundary. The thrust collar 22 is inserted to the turbine shaft 8 up to a position where the thrust collar 22 comes into contact with the step portion 8*a*.

The oil thrower 23 is inserted to the turbine shaft 8 up to a position where the oil thrower 23 comes into contact with the thrust collar 22. The compressor wheel 10 is inserted to the turbine shaft 8 up to a position where the compressor wheel 10 comes into contact with the oil thrower 23.

After the compressor wheel 10 is pressed into the turbine shaft 8, the nut 26 is screwed to the thread groove 8*b* of the turbine shaft 8. In a state where the thrust collar 22, the oil thrower 23 and the compressor wheel 10 are positioned between the step portion 8*a* of the turbine shaft 8 and the nut 26, the nut 26 fastens them. The fastening (that is, the fastening force generated by the nut 26) generates a compression force (an axial force) in an axial direction of the turbine shaft 8. Furthermore, the axial force generates a friction resistance in the contact portion of each of the step portion 8*a*, the thrust collar 22, the oil thrower 23, the compressor wheel 10 and the nut 26. As a result, it is possible to suppress rotational deviation in which each of the rotary member 25 and the compressor wheel 10 relatively rotates with respect to the turbine shaft 8, and thus the rotary member 25 and the compressor wheel 10 rotate integrally with the turbine shaft 8.

In addition, the friction resistance of the insertion site to the compressor wheel 10 and the compressor wheel 10 in the turbine shaft 8 is increased by pressing the turbine shaft 8 into the compressor wheel 10. Therefore, the rotational deviation of the compressor wheel 10 and the turbine shaft 8 is further suppressed. However, the friction resistance is increased also with respect to the movement in the axial direction of the turbine shaft 8 by pressing the turbine shaft 8 into the compressor wheel 10. Therefore, press fitting force management or the like is required in order to insert the compressor wheel 10 with no gap up to the thrust collar 22 and the oil thrower 23.

Additionally, as shown in FIG. 2, the fastening of the rotary member 25 and the compressor wheel 10 by the nut 26 is carried out in a state where the turbine shaft 8 is inserted to the bearing housing 2 and the radial bearing 7, and the thrust bearings 20 and 21 and the seal plate 24 are attached. As a result, the rotary member 25 and the compressor wheel 10 are covered with the bearing housing 2. For example, it is not possible to visually check from the outside whether or not the turbine shaft 8 is inserted to the position where the step portion 8*a*, the thrust collar 22, the oil thrower 23 and the compressor wheel 10 come in contact in the axial direction. Furthermore, the thrust collar 22 and the oil thrower 23 cannot be rotated in the rotating direction of the turbine shaft 8 by applying force to the thrust collar 22 and the oil thrower 23 from the external portion. Namely, it is hard to directly check whether or not the axial force acting on the thrust collar 22 and the oil thrower 23 is appropriate. Therefore, according to the present embodiment, it is indirectly checked whether or not the axial force is appropriate, by measuring and analyzing the vibration of the turbine shaft 8.

Specifically, as shown in FIG. 2, a measurement portion 27 is installed on an outer peripheral surface 26*a* of the nut 26 at a stage before the turbine housing 4 and the compressor housing 6 are attached, at the assembling time of the turbocharger C. The measurement portion 27 is constituted by an accelerometer (a pickup) which directly detects vibration of an object. After the measurement portion 27 is installed, the vibration is applied to the turbine shaft 8. For example, small shock is applied, in the radial direction of the turbine shaft 8, to the outer peripheral surface of the protruding site 9*a* in the axial direction of the turbine wheel 9 (hammering), as shown by an arrow in FIG. 2. The measurement portion 27 may be constituted by a noise level meter which detects sound generated together with the vibration described above. The vibration applied to the turbine shaft 8 is set small to the extent of not affecting balance and strength of the rotating parts constituted by the turbine shaft 8. In this case, there is a possibility of being harder to discriminate the sound generated together with the vibration and the peripheral noise, in the noise level meter. Therefore, there is a case where the measurement portion 27 is desirably constituted so as to directly detect the vibration, depending on the magnitude of the applied vibration.

Figure 4A:
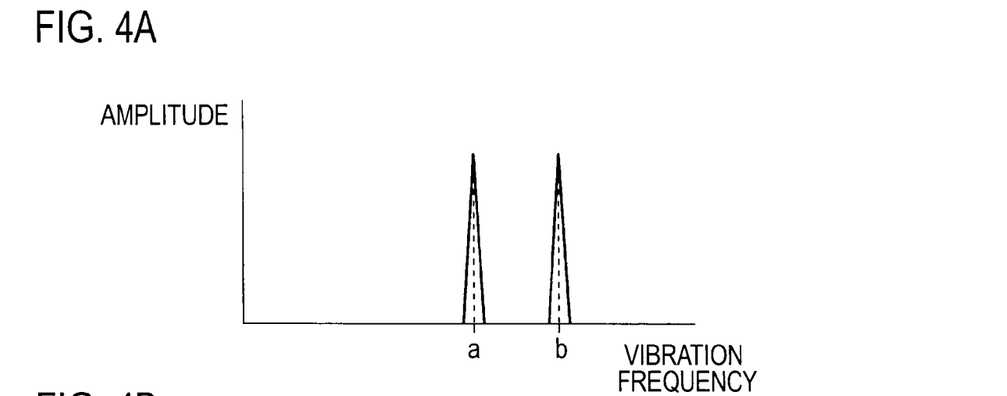
FIG. 4A and FIG. 4B are explanatory views for explaining a relationship between vibration frequency and axial force.
Figure 4B:
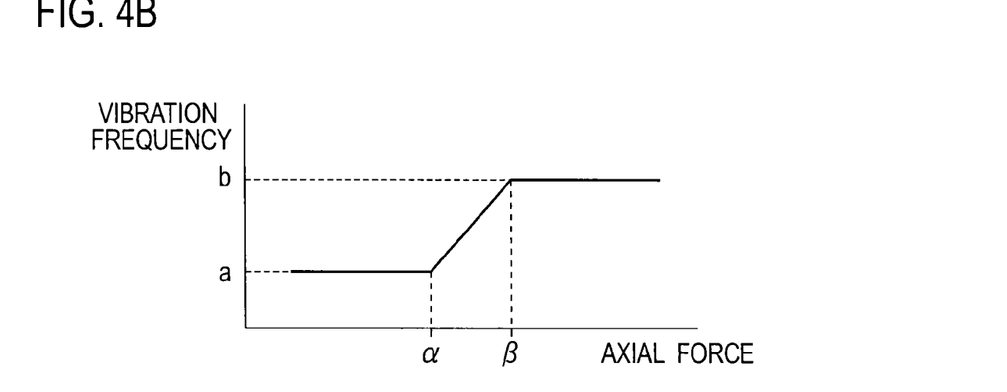

FIG. 4A and FIG. 4B are explanatory views for explaining the relationship between the vibration frequency and the axial force. A vibration frequency (a characteristic value) such as a vibration frequency a indicating the peak of vibration or a vibration frequency b is observed by obtaining a characteristic value through the analysis of the vibration of the turbine shaft 8 on the basis of an output value of the measurement portion 27 (refer to FIG. 4A).

As shown in FIG. 4B, in the case where the axial force is equal to or less than a threshold value $\alpha$, the characteristic value roughly becomes the vibration frequency a. The characteristic value takes a value which is proportional to the axial force, from the vibration frequency a to the vibration frequency b which is larger than the vibration frequency a, until the axial force becomes a threshold value $\beta$ which is larger than the threshold value $\alpha$, from the threshold value $\alpha$. In addition, in the case where the axial force is equal to or more than the threshold value $\beta$, the characteristic value roughly becomes the vibration frequency b.

In the case where the axial force is equal to or less than the threshold value $\alpha$, the rotary member 25 and the compressor wheel 10 are applied as a weight to the turbine shaft 8, and thus the characteristic value is low. In this state, the axial force falls short. In addition, in the case where the axial force is equal to or more than the threshold value $\beta$, the axial force is sufficiently generated, and the turbine shaft 8, the rotary member 25 and the compressor wheel 10 are in a state of integrally vibrating, and thus the characteristic value is high. In this state, the axial force is sufficiently generated. A transition state is formed from the threshold value $\alpha$ to the threshold value $\beta$ of the axial force.

From the relationship between the axial force and the characteristic value described above, it becomes possible to check on the basis of the characteristic value whether or not the axial force is appropriate. For example, in a state shown in FIG. 3, sufficient generation of the axial force is directly checked, the measurement portion 27 is installed on the outer peripheral surface 26a of the nut 26, the vibration is applied to the protruding site 9a in the axial direction of the turbine wheel 9, and thus the vibration is measured and analyzed. Additionally, a rough range (a setting range) of the characteristic value is previously specified in consideration of a measurement error of the vibration. The setting range is at least set so that the vibration frequency a corresponding to the characteristic value of the vibration when the axial force as described above falls short is not included. In addition, the setting range may be specified at least once regarding the same type of turbocharger C.

Furthermore, after the turbocharger C is assembled to a state shown in FIG. 2, the measurement portion 27 is installed on the outer peripheral surface 26a of the nut 26, the vibration is applied to the protruding site 9a in the axial direction of the turbine wheel 9, and the vibration is measured and analyzed. Here, the measurement portion 27 indirectly measures the vibration of the turbine shaft 8 vibrating integrally with the nut 26 by measuring the vibration of the nut 26.

Additionally, it is determined whether or not the characteristic value of the vibration of the turbine shaft 8 is included in a setting range previously set. In other words, it is determined whether or not the peak appears at the vibration frequency in the setting range previously set, regarding the vibration of the turbine shaft 8.

As a result, in the case where the characteristic value of the vibration of the turbine shaft 8 is included in the setting range previously set, it is known that the axial force is sufficiently generated, and the turbine shaft 8, the rotary member 25 and the compressor wheel 10 are integrated. Furthermore, in the case where the characteristic value of the vibration of the turbine shaft 8 is not included in the setting range previously set (in the case where the peak does not appear at the vibration frequency in the setting range previously set), the turbocharger C is ejected from a line of an assembling device.

Figure 5:
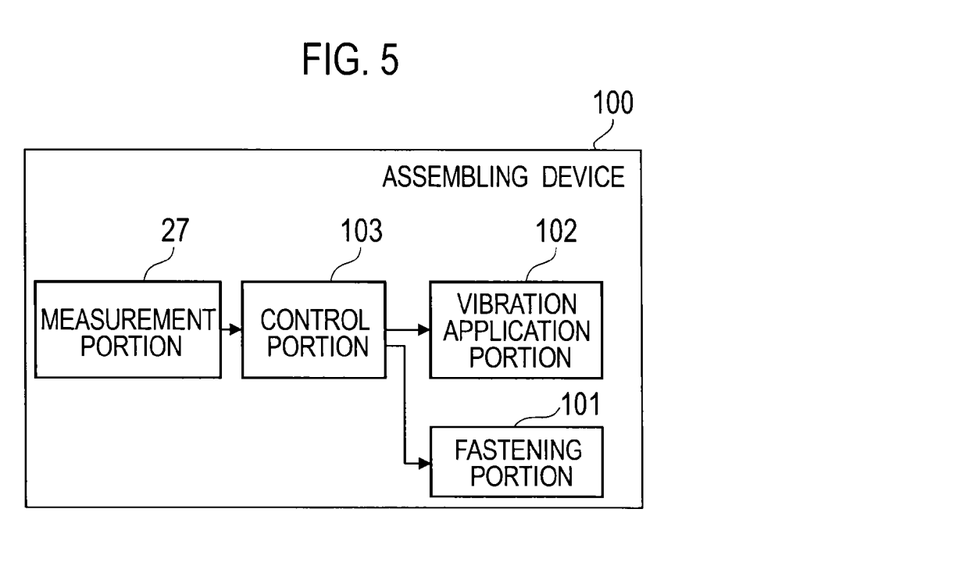
FIG. 5 is a functional block diagram of an assembling device according to an embodiment of the present disclosure.

FIG. 5 is a functional block diagram of an assembling device 100. In FIG. 5, arrows indicate signal flow. As shown in FIG. 5, the assembling device 100 (a wheel fastening device) is provided with a fastening portion 101, a vibration application portion 102, the measurement portion 27, and a control portion 103 (a determination portion). A description will be in detail given of specific processing of the respective function portions with reference to explanatory views in FIGS. 6 and 7.

Figure 6:
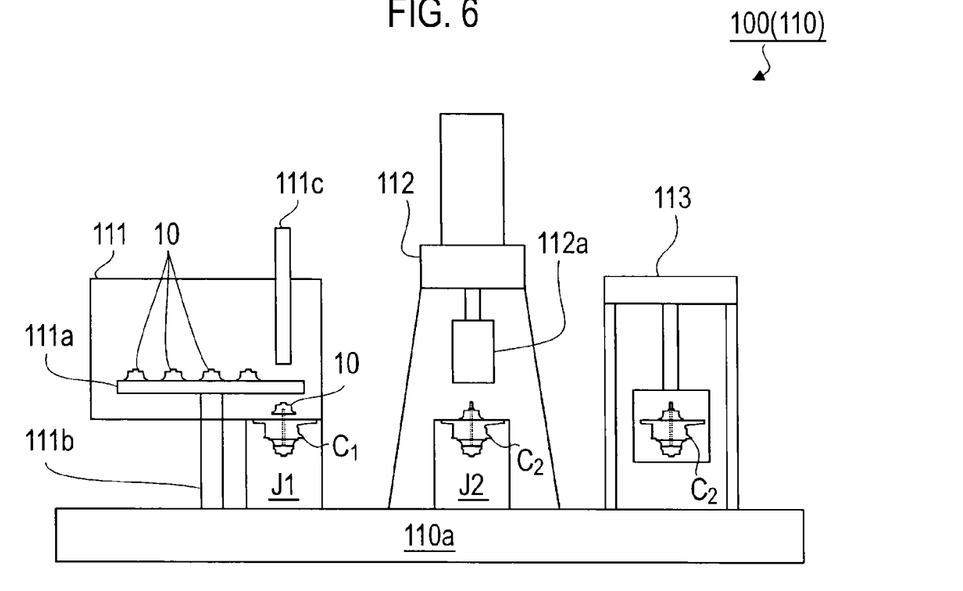
FIG. 6 is a first view for explaining the assembling device.
Figure 7:
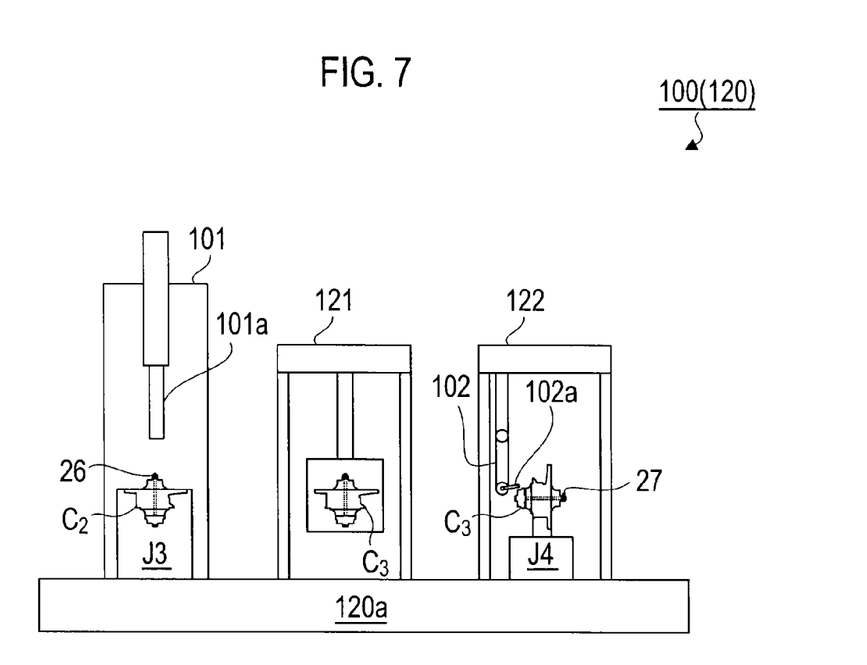
FIG. 7 is a second view for explaining the assembling device.

FIG. 6 is a first view for explaining the assembling device 100, and FIG. 7 is a second view for explaining the assembling device 100. As shown in FIGS. 6 and 7, the assembling device 100 is constituted by a first assembling device 110 and a second assembling device 120.

In the first assembling device 110 shown in FIG. 6, a heating portion 111, a press fitting portion 112 and a carrying-out portion 113 are installed above a pedestal 110a. The heating portion 111 has a discoid turn table 111a and a heater (not shown). The center portion of the turn table 111a is downward supported by a post member 111b which stands on the pedestal 110a, and the turn table 111a rotates around the post member 111b by power of a motor (not shown) or the like.

After the compressor wheel 10 is transferred onto the turn table 111a, the heater is inserted to the hole of the compressor wheel 10 for inserting the turbine shaft 8. During the rotation of the turn table 111a, the compressor wheel 10 is heated by the heater, whereby an inner diameter of the hole is enlarged.

The turbocharger C before the turbine housing 4, the compressor wheel 10, the nut 26 and the compressor housing 6 are attached, namely, the turbocharger C before press fitting of the compressor wheel 10 (hereinafter, referred to as a turbocharger C1) is attached to a jig J1, and is transferred below the turn table 111a.

In addition, when the compressor wheel 10 reaches above the turbocharger C1 by the rotation of the turn table 111a, an incorporation portion 111c inserts the turbine shaft 8 of the turbocharger C1 into the compressor wheel 10. Additionally, after the jig J1 is replaced by a jig J2, the turbocharger C1 is transferred to the press fitting portion 112.

The press fitting portion 112 has an actuator 112a such as a hydraulic cylinder, and the actuator 112a presses the compressor wheel 10 by pressure corresponding to a control of the control portion 103. The turbine shaft 8 of the turbocharger C1 is pressed into the compressor wheel 10 by the pressing. The turbocharger C into which the compressor wheel 10 is pressed, namely, the turbocharger C before the fastening by the nut 26 is completed (hereinafter, referred to as a turbocharger C2) is cooled by a cooling portion (not shown) in a state where the pressing by the actuator 112a is continued. The cooling by the cooling portion is carried out by, for example, injecting compressed air.

The cooled turbocharger C2 is transferred to the carrying-out portion 113. The jig J2 is removed from the turbocharger C2. Thereafter, the turbocharger C2 is transferred to the second assembling device 120. At this time, the nut 26 is provisionally fastened to the shaft end side on the compressor wheel 10 side of the turbine shaft 8.

In the second assembling device 120 shown in FIG. 7, the fastening portion 101, a carrying-out portion 121 and an inspection portion 122 are provided above a pedestal 120a. The turbocharger C2 is transferred to the fastening portion 101, and a jig J3 is attached. At this time, the nut is in a state where the nut 26 is provisionally fastened.

The fastening portion 101 has a nut runner 101a. The nut runner 101a finally fastens the provisionally fastened nut 26 of the turbocharger C2 by a torque corresponding to the control of the control portion 103.

The nut 26 is finally fastened, and the turbocharger C before the inspection of the axial force (hereinafter, referred to as a turbocharger C3) is transferred to the carrying-out portion 121. The carrying-out portion 121 removes the jig J3 from the turbocharger C3. Thereafter, the turbocharger C3 is transferred to the inspection portion 122.

Additionally, the turbocharger C3 is placed on a jig J4. Furthermore, the measurement portion 27 is installed on the outer peripheral surface 26a (refer to FIG. 2) of the nut 26.

The inspection portion 122 has the vibration application portion 102, and the measurement portion 27 described above. The vibration application portion 102 is constituted, for example, by a robot arm to which a metal rod 102a is attached in its leading end, and applies the vibration to the protruding site 9a (refer to FIG. 2) in the axial direction of the turbine wheel 9 in response to the control of the control portion 103. The structure of the vibration application portion 102 can be optionally constituted within a range which can apply desired vibration.

The control portion 103 determines on the basis of the output value of the measurement portion 27 whether or not the characteristic value of the vibration of the turbine shaft 8 (the nut 26) is included in the setting range previously set. The control portion 103 determines that the axial force is sufficiently generated, if the characteristic value of the vibration of the turbine shaft 8 is included in the setting range previously set. In this case, the control portion 103 moves the turbocharger C having finished the inspection to a step of fastening the turbine housing 4 and the compressor housing 6.

On the other hand, in the case where the characteristic value of the vibration of the turbine shaft 8 is not included in the setting range previously set, there is a high possibility of insufficiency of the axial force. Therefore, the control portion 103 ejects the turbocharger C outside the line of the assembling device 100.

Figure 8:
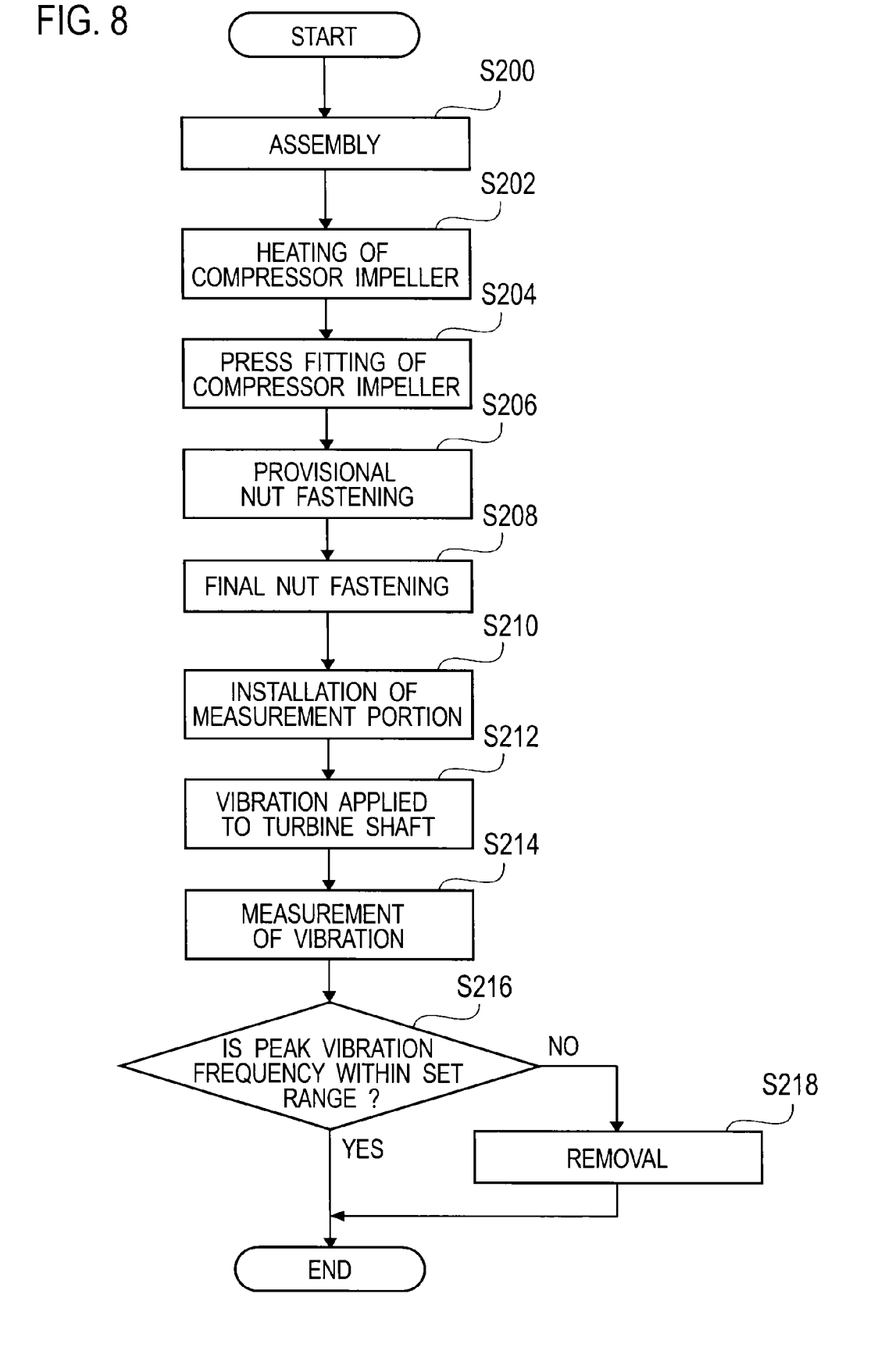
FIG. 8 is a flow chart for explaining a processing flow of a wheel fastening method.

FIG. 8 is a flow chart for explaining a processing flow of a wheel fastening method. As shown in FIG. 8, the turbocharger C is, first, assembled to the state before the press fitting described above in the turbocharger C (S200). Namely, in a step of S200, the turbocharger C1 is assembled. Additionally, the heating portion 111 heats the compressor wheel 10 (S202), and the press fitting portion 112 presses the compressor wheel 10 into the turbine shaft 8 of the turbocharger C1 (S204). Thereafter, the nut 26 is provisionally fastened to the turbine shaft 8 of the turbocharger C2 (S206), and is finally fastened by the fastening portion 101 (S208).

As described above, the turbine shaft 8 is inserted to the bearing housing 2, protrudes from the bearing housing 2, and at its both ends, is provided with the wheels (the turbine wheel 9 and the compressor wheel 10). The compressor wheel 10 is fastened to the turbine shaft 8 by the nut 26. The rotary member 25 and the compressor wheel 10 are fastened to the turbine shaft 8 integrally with the compressor wheel 10, by the fastening force (the axial force) generated by the nut 26 at this time.

In the turbocharger C3, the measurement portion 27 is installed on the outer peripheral surface 26a (refer to FIG. 2) of the nut 26 (S210). Subsequently, the vibration application portion 102 indirectly applies the vibration to the turbine shaft 8 by applying the vibration to the protruding site 9a (refer to FIG. 2) in the axial direction of the turbine wheel 9 which is welded to the turbine shaft 8 (S212).

In addition, the measurement portion 27 on the outer peripheral surface 26a (refer to FIG. 2) indirectly measures the vibration of the turbine shaft 8 from the vibration of the nut 26 (S214)

The control portion 103 determines whether or not the characteristic value of the vibration of the turbine shaft 8 measured by the measurement portion 27 is included in the setting range previously set (S216). When the characteristic value is included in the set range (YES in S216), the control portion 103 performs the processing such as fastening or the like of the turbine housing 4 and the compressor housing 6. In the case where the characteristic value is not included in the setting range (No in S216), the control portion performs ejection outside the line of the assembling device 100 (S218). Note that, in the case where the torque finally fastened by the nut runner 101a is perceived to be smaller than a previously set torque, the control portion 103 may return to the processing of the final fastening processing step S208 by resetting the fastening torque of the nut runner 101a.

According to the assembling device 100 and the wheel fastening method described above, it becomes possible to check whether or not the axial force between the turbine shaft 8 and the rotary member 25 is appropriate by suppressing rise in a manufacturing cost.

Additionally, in the embodiment described above, the description is given of the assembling device 100 of the turbocharger C and the wheel fastening method, but there is also provided a wheel fastening inspection device having: the vibration application portion 102 which carries out a process of inspecting whether or not the axial force acting on the step portion 8a of the turbine shaft 8, the rotary member 25, and the compressor wheel 10; the measurement portion 27; and the control portion 103 (the determination portion), in the assembling device 100 and the wheel fastening method described above, and an inspection method which carries out the vibration application processing step S212, the measurement processing step 214 and the determination processing step S216. The same effect as that of the assembling device 100 and the wheel fastening method can be achieved also by the wheel fastening inspection device and the wheel fastening inspection method described above.

In the embodiment described above, the description is given of the case where the measurement portion 27 is installed on the outer peripheral surface 26a of the nut 26, and the shock in the radial direction is applied to the protruding site 9a in the axial direction of the turbine wheel 9, but the measurement portion 27 may be installed in any of the turbine wheel 9, the compressor wheel 10, the turbine shaft 8, and the rotary member 25 shown in FIG. 3, or may be always installed in the assembling device 100, the wheel fastening inspection device or the jig J4. In this case, the operation of attaching and detaching the measurement portion 27 to and from the turbocharger C3 can be omitted. In addition, the shock applying site may be the turbine shaft 8 and the vibration may be directly applied to the turbine shaft 8. Additionally, as long as the vibration can be generated in the turbine shaft 8, any other place may be used. Furthermore, the vibration may be applied to the turbine shaft 8 by the other external force than the shock.

Furthermore, in the embodiment described above, the description is given of the case where the assembling device 100 is constituted by the first assembling device 110 and the second assembling device 120, but the assembling device may be constituted by one device, and may perform the processing carried out by the first assembling device 110 and the second assembling device 120.

In addition, in the embodiment described above, the description is given of the case where the place where the processing by the fastening portion 101 is performed is different from the place where the processing by the inspection portion 122 is performed, in the second assembling device 120, but the place where the processing by the fastening portion 101 is performed may be the same as the place where the processing by the inspection portion 122 is performed. In this case, it becomes possible to omit the operation of transferring the turbocharger C3.

Furthermore, in the embodiment described above, the description is given of the case where the rotary member 25 is constituted by the thrust collar 22 and the oil thrower 23, but the thrust collar 22 and the oil thrower 23 are not components essential for the rotary member, and the other member which is fastened integrally with the turbine shaft 8 by the fastening force of the nut 26 may be included in the rotary member.

Hereinabove, although the description is given above of the preferable embodiment according to the present invention with reference to the accompanying drawings, however, it goes without saying that the present disclosure is not limited to the embodiment described above. It is apparent that a person skilled in the art could have arrived at various modified examples or corrected examples in the scope stated in claims, and it is understood that these examples naturally belong to the technical range of the present disclosure.

What is claimed is:

1. A wheel fastening inspection method comprising:
    directly or indirectly applying vibration to a turbine shaft having been inserted to a bearing housing, the turbine shaft being provided with wheels at both ends protruding from the bearing housing, at least one of the wheels being fastened by a fastening member, and a rotary member being fastened by a fastening force generated by the fastening member to the turbine shaft to be integrally rotated with the wheel;
    measuring the vibration of the turbine shaft; and
    determining whether or not a vibration frequency at which a peak of the measured vibration of the turbine shaft is given is included in a setting range previously set.

2. The method according to claim 1, wherein
    the applying of vibration is made by hammering.

3. The method according to claim 1, wherein
    the applying of the vibration is made before a turbine housing and a compressor housing are connected to the bearing housing.

4. The method according to claim 1, further comprising:
    determining that the fastening force generated by the fastening member is sufficient if the peak of the measured vibration is included in the setting range previously set.

5. A wheel fastening method comprising:
    fastening at least one of wheels at both ends of a turbine shaft by a fastening member, the turbine shaft having been inserted to a bearing housing, and the both ends of the turbine shaft protruding from the bearing housing, and fastening a rotary member integrally rotated with the wheels to the turbine shaft by a fastening force generated by the fastening member;
    directly or indirectly applying vibration to the turbine shaft;
    measuring the vibration of the turbine shaft; and
    determining whether or not a vibration frequency at which a peak of the measured vibration of the turbine shaft is given is included in a setting range previously set.

6. The method according to claim 5, wherein
    the applying of vibration is made by hammering.

7. The method according to claim 5, wherein
    the applying of the vibration is made before a turbine housing and a compressor housing are connected to the bearing housing.

8. The method according to claim 5, further comprising:
    determining that the fastening force generated by the fastening member is sufficient if the peak of the measured vibration is included in the setting range previously set.

9. A wheel fastening inspection device comprising:
    a vibration application portion configured to directly or indirectly apply vibration to a turbine shaft having been inserted to a bearing housing, the turbine shaft being provided with wheels at both ends protruding from the bearing housing, at least one of the wheels being fastened by a fastening member, and a rotary member being fastened by a fastening force generated by the fastening member to the turbine shaft to be integrally rotated with the wheel;
    a measurement portion configured to measure the vibration of the turbine shaft; and
    a determination portion configured to determine whether or not a vibration frequency at which a peak of the measured vibration of the turbine shaft is given is included in a setting range previously set.

10. The device according to claim 9, wherein
    the vibration application portion is configured to apply the vibration by hammering.

11. The device according to claim 9, wherein
    the vibration application portion is configured to apply the vibration before a turbine housing and a compressor housing are connected to the bearing housing.

12. The device according to claim 9, wherein
    the determination portion is further configured to determine that the fastening force generated by the fastening member is sufficient if the peak of the measured vibration is included in the setting range previously set.

13. A wheel fastening device comprising:
    a fastening portion configured to fasten at least one of wheels at both ends of a turbine shaft by a fastening member, the turbine shaft having been inserted to a bearing housing, and the both ends of the turbine shaft protruding from the bearing housing, and the fastening portion configured to fasten a rotary member integrally rotated with the wheels to the turbine shaft by a fastening force generated by the fastening member;
    a vibration application portion configured to directly or indirectly apply vibration to the turbine shaft;
    a measurement portion configured to measure the vibration of the turbine shaft; and
    a determination portion configured to determine whether or not a vibration frequency at which a peak of the measured vibration of the turbine shaft is given is included in a setting range previously set.

14. The device according to claim 13, wherein
the vibration application portion is configured to apply the vibration by hammering.

15. The device according to claim 13, wherein
the vibration application portion is configured to apply the vibration before a turbine housing and a compressor housing are connected to the bearing housing.

16. The device according to claim 13, wherein
the determination portion is further configured to determine that the fastening force generated by the fastening member is sufficient if the peak of the measured vibration is included in the setting range previously set.

* * * * *